Dec. 15, 1964    J. G. KEENAN ETAL    3,161,019
GAS TURBINE ENGINES
Filed July 5, 1961    4 Sheets-Sheet 1
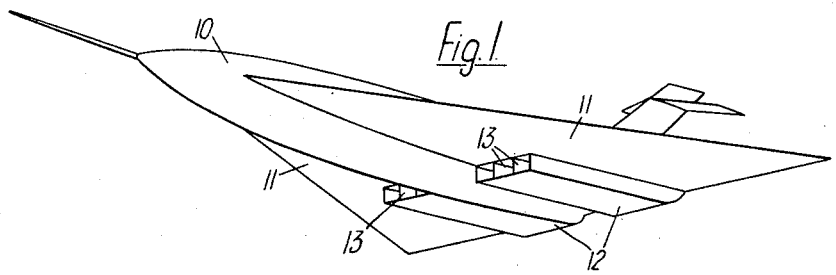
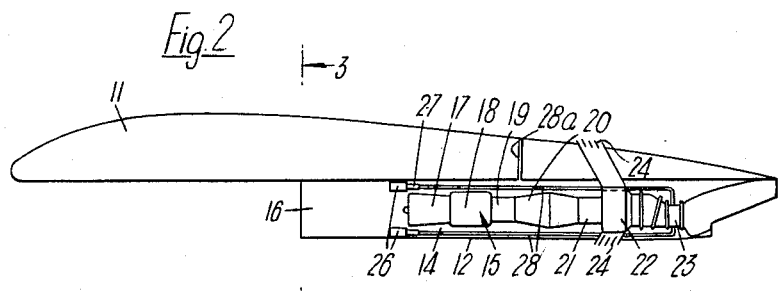
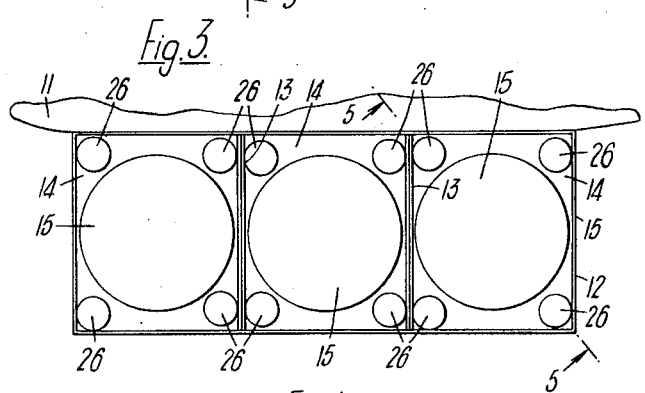
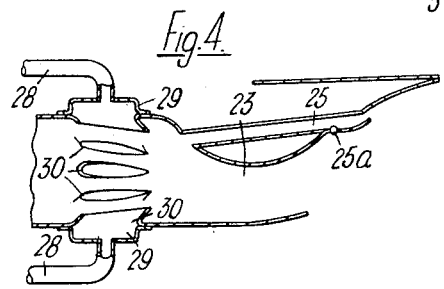
Inventors
John Gregory Keenan
Jack Palfreyman
Frederick Freeman
By
Cushman, Darby & Cushman
Attorneys Inventors
John Gregory Keenan
Jack Aletheyman
Frederick Keenan
By Cushman, Darby & Cushman
Attorneys

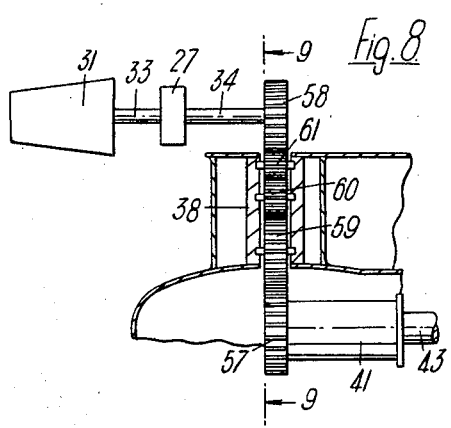
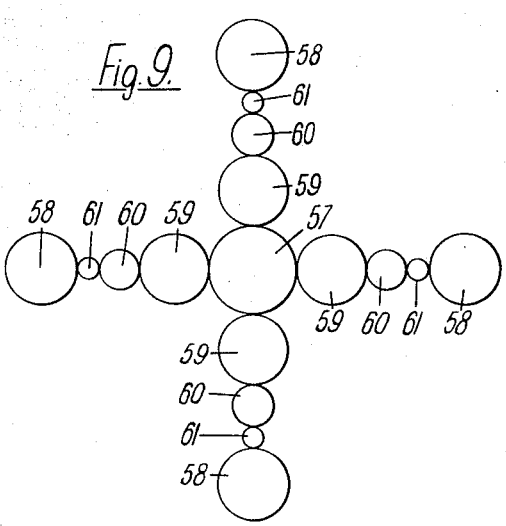

Dec. 15, 1964    J. G. KEENAN ETAL    3,161,019
GAS TURBINE ENGINES
Filed July 5, 1961    4 Sheets-Sheet 4
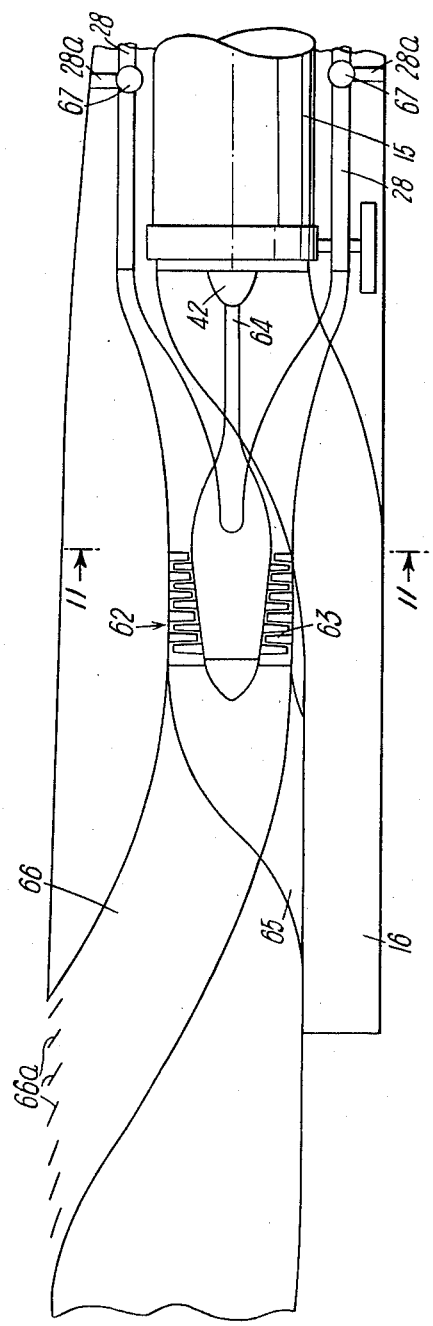
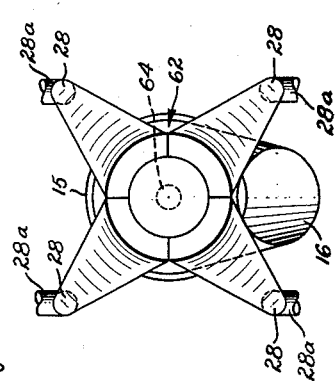
Inventors
John Gregory Keenan
Jack P. Freyman
Frederick Freeman
By
Cushman, Darby & Cushman
Attorneys

United States Patent Office 3,161,019
Patented Dec. 15, 1964

3,161,019
GAS TURBINE ENGINES
John Gregory Keenan, Shelton Lock, Jack Palfreyman, Tansley, near Matlock, and Frederick Freeman, Shelton Lock, England, assignors to Rolls-Royce Limited, Derby, England
Filed July 5, 1961, Ser. No. 121,992
Claims priority, application Great Britain, July 27, 1960, 26,205
13 Claims. (Cl. 60—35.6)

This invention relates to gas turbine engines and in particular to gas turbine engines producing a propulsive thrust capable of propelling an aircraft at supersonic speeds.

The hot gases from the gas turbine engines are exhausted to atmosphere through a propulsion nozzle and it is normal practice to design the nozzle effective outlet area to match engine gas flow when the engines are producing a propulsive thrust capable of propelling the aircraft at its supersonic cruising speed.

When the aircraft is operating at speeds well below cruising speed the nozzle outlet area designed for efficient operation at cruise is too large to be efficient and means are provided for reducing the nozzle effective outlet area to suit the below cruise flight speeds. This is because the cross-section of the exhaust gas stream at the outlet is less at low speeds than it is at cruise and the nozzle outlet area has to be reduced in order to match the cross-section of the exhaust gas stream.

It has been found that when the nozzle outlet area is reduced an increase is incurred in the base drag around the propulsive jet and that the take-off noise level is high.

In order to reduce the take-off noise level it is desirable to reduce the velocity of the exhaust gases and in order not to reduce the thrust of the engine it has been found desirable to inject a large flow of additional air into the exhaust gas stream. The injection of the additional air into the gas stream also reduces the base drag by filling in the spaces normally occupied by hot propulsive gases under supersonic cruise flight speed conditions. The additional air injected into the gas stream increases the cross-section of the exhaust gas stream and the effective nozzle outlet does not need to be reduced.

It has been found desirable to extract the additional air from the air intake leading to the gas turbine engine but this gives rise to the difficulty that the clearance between the gas turbine engine and the inner walls of the engine nacelle has to be large in order to pass around the outside of the engine the large amount of additional air required. This has the disadvantage of increasing the frontal area of the nacelle thus incurring a greater drag on the aircraft.

If the engine is designed to a larger scale in order to pass sufficient additional air internally then the weight of the engine is considerably increased. As an engine is designed to give a specific engine weight/fuel weight ratio for application to a particular aircraft, it is essential that the weight of the engine is not substantially increased.

One of the objects of the present invention is to pass a large quantity of additional air from the air intake of the gas turbine engine to the propulsion nozzle without substantially increasing the weight of the engine or increasing the frontal area of the nacelle beyond that normally required.

According to the present invention a gas turbine engine is arranged to drive through clutch or coupling means one or more auxiliary compressors situated at or near the engine air intake which receive air from the air intake of the engine and deliver to ducting which conveys the whole of the air compressed in the auxiliary compressors to the propulsion nozzle of the gas turbine engine.

Each duct conveying compressed air to the propulsion nozzle may be provided with valve means operable to direct the air either to the propulsion nozzle or overboard or to restrict the flow of air.

The auxiliary compressors may be prevented from windmilling when the clutch or coupling means is disengaged by closing the valve means thereby preventing a flow of air through the compressor.

Alternatively the flow of air through the auxiliary compressors may be prevented by closing off the intake of each auxiliary compressor by retractable doors or other means.

The valve means may act as a non-return valve preventing exhaust gases passing back up the ducting when compressed air from the auxiliary compressor is not being supplied to the propulsion nozzle.

Alternatively a separate non-return valve may be provided in the ducting in addition to the said valve means.

In one arrangement the air intake duct is rectangular or square in cross-section and the engine is arranged to drive an auxiliary compressor located in each corner of the rectangle or square.

Each of the auxiliary compressors may be driven by a series of bevel gears rotated by a shaft driven by the compressor of the gas turbine engine.

The series of bevel gears may comprise a first bevel gear rotated by the compressor of the engine, a second bevel gear meshing with the said first bevel gear, a drive shaft passing through a strut of the engine, said shaft being connected at its inner end with said second bevel gear and at its radial outer end with a third bevel gear which meshes with a fourth bevel gear connected to the input side of a clutch, the output drive from said clutch being connected with the rotor shaft of the auxiliary compressor.

In an alternative gear arrangement the drive from the engine compressor may be divided into two drive shafts each arranged to drive the input shaft of the clutch.

In a further alternative gear arrangement the drive from the engine compressor may be divided into two drive shafts each drive shaft being arranged to rotate half of the auxiliary compressor through clutch means.

In yet a further alternative gear arrangement the drive from the engine compressor to the input shaft of the auxiliary compressor clutch may be achieved by a series of spur gears.

In each of the gear arrangements just described the clutch may be provided between the drive from the engine compressor and the gear arrangement.

Alternatively the gas turbine engine may be arranged to drive a single auxiliary compressor located ahead of the engine and on the same rotational axis as the gas turbine engine.

The auxiliary compressors may receive air from the air intake leading to the gas turbine engine and/or from a second air intake leading from atmosphere and including valve means for closing off the entry to the second air intake.

Preferably the compressed air flowing through the ducts leading from the auxiliary compressors is injected into the propulsion nozzle of the gas turbine engine through radial chutes which project into the hot propulsive gas stream.

Some embodiments of the present invention will now be described with reference to the following specification and drawings, in which:

FIGURE 1 is a diagrammatic perspective view of a supersonic aircraft provided with gas turbine engines having rectangular air intakes;

FIGURE 2 is a section through the wing of the supersonic aircraft showing the location of the gas turbine engines;

FIGURE 3 is a section taken on the line 3—3 shown on FIGURE 2;

FIGURE 4 shows in diagrammatic form and to a larger scale the propulsion nozzle shown in FIGURE 2;

FIGURE 8 is a diagrammatic view of yet another alternative method of driving auxiliary compressors;

FIGURE 9 is a section taken on the line 9—9 shown on FIGURE 8;

FIGURE 10 is a diagrammatic section showing a still further alternative method of driving an auxiliary compressor, and, FIGURE 11 is a section taken on the line 11—11 shown on FIGURE 10.

Figure 5:
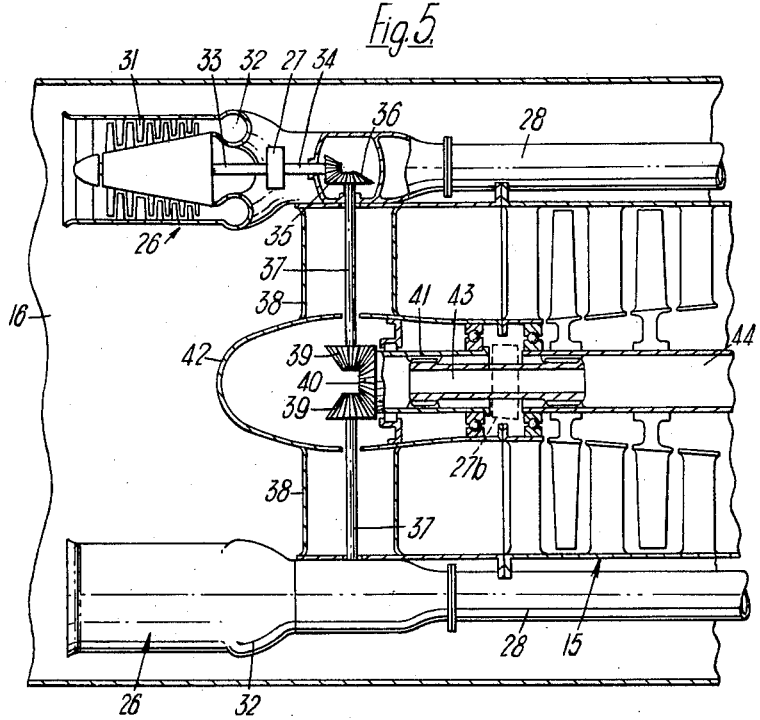
FIGURE 5 is an axial section through the forward end of a gas turbine engine driving auxiliary compressors.

Referring to FIGURES 1 to 4 of the drawings, a supersonic aircraft 10 has wings 11 beneath each of which is mounted a substantially box-shaped nacelle 12. The nacelle 12 is divided by internal walls 13 into three longitudinally extending compartments 14 each of which houses a gas turbine propulsion engine 15.

Each gas turbine engine 15 comprises in flow series an air intake 16, compressor 17, combustion equipment 18, turbine 19, turbine exhaust duct 20, jet pipe section 21, thrust reverser 22 and a propulsion nozzle 23.

The thrust reverser 22 is adapted, when brought into operation, to direct the hot propulsive gases forwardly past deflector vanes 24 in order to produce a braking effect on the aircraft 10.

The propulsion nozzle 23 includes a duct 25 which is provided with a flap 25a at its downstream end.

Each rectangular air intake 16 houses four auxiliary compressors 26, each of which is driven from the gas turbine engine 15 through a clutch 27 which may be a frictional clutch. Alternatively a coupling device in the form of a dog clutch or a fluid clutch can be used. The auxiliary compressors 26 receive air from the air intake 16 and deliver to conduits 28 which convey the whole of the air compressed in the auxiliary compressors 26 to a manifold 29 surrounding the propulsion nozzle 23 upstream of the duct 25. The air from the manifold 29 passes into the interior of the nozzle 23 through a number of mixer chutes 30.

As will be seen more clearly from FIGURE 5 each auxiliary compressor 26 comprises an axial flow compressor rotor 31 which receives air from the air intake 16 and delivers to a volute 32 which has its outlet connected to a conduit 28. The axial flow compressor rotor 31 is mounted on a shaft 33 which is the output shaft from a clutch 27. The input drive shaft 34 to the clutch 27 is provided at its end remote from the clutch 27 with a bevel gear 35 which meshes with a bevel gear 36 formed on the radially outer end of a drive shaft 37.

The drive shaft 37 passes through a hollow intake strut 38 of the gas turbine engine 15 and carries a second bevel gear 39 which meshes with a bevel gear 40 provided on the end of a shaft 41 mounted within the intake bullet 42 of the gas turbine engine 15. A quill shaft 43 drivingly connects the shaft 41 with the engine compressor shaft 44.

It will be seen, therefore, that when the gas turbine engine 15 is operating and the clutch 27 is engaged the auxiliary axial flow compressor rotor 31 is driven from the engine compressor shaft 44 via quill shaft 43, shaft 41, bevel gears 40, 39, shaft 37, bevel gears 36, 35, input drive shaft 34, clutch 27 and shaft 33.

Figure 6:
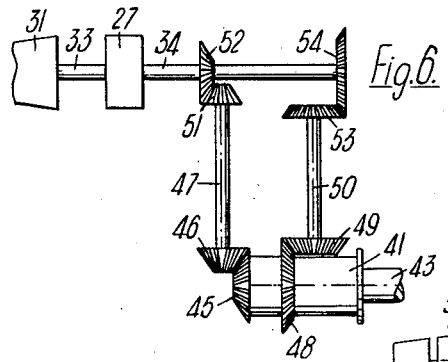
FIGURE 6 is a diagrammatic view of an alternative method of driving auxiliary compressors.

An alternative method of driving the auxiliary axial flow compressor rotor 31 is shown in FIGURE 6. In this arrangement the drive from the shaft 41 is taken through bevel gears 45 and 46 to a shaft 47 and also through bevel gears 48 and 49 to a shaft 50. The shafts 47 and 50 drive the input drive shaft 34 through bevel gears 51, 52 and 53, 54 respectively.

Figure 7:
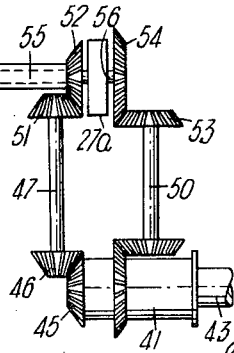
FIGURE 7 is a diagrammatic view of another alternative method of driving auxiliary compressors.

In the gear arrangement shown in FIGURE 7 the bevel gears 52 and 54 are respectively connected to input drive shafts 55 and 56 each of which is arranged to rotate half of the compressor rotor 31 through clutches 27 and 27a.

Instead of driving the auxiliary compressors through bevel gears they may be driven through a train of spur gears as shown in FIGURES 8 and 9. In such an arrangement the shaft 41 is provided with a spur gear 57 which drives a spur gear 58, connected to the input drive shaft 34, through a number of intermediate spur gears 59, 60 and 61. The spur gears 59, 60 and 61 are rotatively mounted on structure formed within the hollow intake strut 38.

Instead of locating the clutches 27, 27a in the positions shown in FIGURES 5, 6, 7 and 8 a clutch or coupling device indicated in dotted lines at 27b in FIGURE 5, may be provided between the engine compressor shaft 44 and the shaft 41. By locating the clutch 27b between the engine compressor shaft 44 and the shaft 41 ensures that the bevel gearing remains stationary when the clutch 27b is disengaged.

In the arrangement shown in FIGURES 10 and 11 a single auxiliary compressor 62 is mounted ahead of the gas turbine engine 15 and on the same horizontal axis. The compressor rotor 63 of the auxiliary compressor 62 is driven by a shaft 64 which lies on the axis of the gas turbine engine 15 and protrudes through the intake bullet 42 which houses a clutch (not shown). The air intake 16 leading to the gas turbine engine 15 passes underneath the auxiliary compressor 62 and a duct 65 leads from the intake 16 to the entry to the auxiliary compressor 62. The duct 65 is intersected by a further duct 66 which leads to atmosphere and the entry to the duct 66 is controlled by a series of flaps 66a. The duct 66 allows excess air to be taken into the auxiliary compressor 62 when the pressure of ram air is low, as for example during ground running.

The outlet from the auxiliary compressor 62 is divided into four portions, each of which lead to a conduit 28.

In each of the embodiments described each of the conduits 28 is provided with a branch conduit 28a and a control valve 67 which in one position allows compressed air to flow to the propulsion nozzle 23, in another position allows the air to pass into the branch conduits 28a to be exhausted to atmosphere and in a third position to prevent a flow of air passing to either conduit 28 or conduit 28a.

The control valves 67 also act as non-return valves preventing a flow of hot propulsive gases passing back up the conduits 28 towards the auxiliary compressors when the clutches 27 are disengaged.

The systems just described are intended to work in the following manner.

When the flight speed of the aircraft 10 is below cruising speed and the gas turbine engines 15 are operating at a near maximum rotational speed the flap 25a is adjusted to open the outlet of the duct 25. The clutches 27 are engaged in order that the auxiliary compressors may be driven by the respective gas turbine engine 15 and the control valves 67 are set to the position in which the whole of the air compressed by the auxiliary compressors is discharged into the propulsion nozzles 23 through the mixer chutes 30. The propulsive thrust from each propulsive nozzle 23 is, therefore, increased due to the passage of the additional compressed air and this reduces the noise of the propulsive gases as compared with the noise produced solely by high velocity hot propulsive gases for the same amount of propulsive thrust. This is particularly advantageous druring take-off.

Also the base drag incurred by the reduced cross-section of the exhaust gas stream is reduced as the mixture of hot gases and additional compressed air flowing through the duct 25 increases the cross-section of the exhaust gas stream and also the hot propulsive gas stream is urged back to the position it occupies when the aircraft 10 is operating at cruise flight speeds.

When the aircraft 10 reaches its desired cruising speed the clutches 27 are disengaged and the auxiliary compressors 26, 62 are brought to rest by moving the control valves 67 to the position in which air flow to the conduits 28, 28a is prevented.

When the aircraft 10 reduces its flight speed below cruise, such as during landing, the auxiliary compressors 26, 62 may be brought into operation in order to improve fuel economy during stand-off or diversion of the aircraft 10.

If the auxiliary compressors 26, 62 are required to be brought into operation during flight, the control valves 67 are moved to the position in which the outlets from the auxiliary compressors are open to the branch conduits 28a. This will allow air to flow through the auxiliary compressors 26, 62 causing them to rotate. When the rotational speed of the auxiliary compressors 26, 62 synchronises with that of the gas turbine engine 15 the clutches 27 will be engaged and the control valves 67 moved to the position in which the compressed air from the auxiliary compressors is discharged into the propulsion nozzle via the conduits 28.

Instead of preventing rotation of the auxiliary compressors 26, 62 by preventing an outflow from each auxiliary compressor they may each be provided with retractable doors or valves which close-off the front end of each auxiliary compressor.

What we claim is:

1. In a power plant for supersonic aircraft, the combination of: a gas turbine engine comprisnig supersonic air intake means, compressor means, combustion means, turbine means and a supersonic propulsion nozzle arranged in series; at least one auxiliary compressor, said auxiliary compressor having an intake duct communicating with said supersonic intake means upstream of the compressor means of said gas turbine engine and arranged to receive a portion of the air therefrom; means to drive said auxiliary compressor off said gas turbine engine; said last mentioned means including a selectively operable clutch for engaging and disengaging said auxiliary compressor from said gas turbine engine; and duct means extending from the discharge end of said auxiliary compressor to said supersonic propulsion nozzle of the gas turbine engine with the same bypassing the compressor means, combustion means, and turbine means of the gas turbine engine, said duct means receiving all of the air compressed by said auxiliary compressor and delivering it into the hot propulsive gas stream within said propulsion nozzle.

2. A power plant as claimed in claim 1 in which said supersonic air intake means includes an air intake duct rectangular in cross-section and in which said auxiliary compressor is positioned adjacent one of the corners of said air intake duct.

3. A power plant as claimed in claim 1 in which said supersonic air intake means includes an air intake duct extending forward of the gas turbine engine and off center with respect to the rotational axis of the same, and in which said auxiliary compressor is positioned forward of and on the same rotational axis as the gas turbine engine, a second air intake duct for said auxiliary compressor communicating with atmosphere, and means for controlling flow of atmospheric air in said second air intake duct for said auxiliary air compressor.

4. A power plant as claimed in claim 1 in which said duct means extending from the discharge end of the auxiliary compressor to said supersonic propulsion nozzle includes means for diverting air flowing therethrough to atmosphere.

5. A power plant as claimed in claim 1 including a manifold surrounding said propulsion nozzle and a plurality of mixer chutes extending radially into said propulsion nozzle from said manifold, said manifold receiving air compressed by said auxiliary compressor and flowing through said duct means and discharging such air through said chutes into the hot propulsive gas stream of said propulsion nozzle.

6. A power plant as claimed in claim 5 in which said propulsion nozzle includes flap means for varying the outlet end thereof, said flap means being located downstream of said chutes.

7. In a power plant for supersonic aircraft, the combination of: a gas turbine engine comprising a supersonic air intake means, compressor means, combustion means, turbine means and a supersonic propulsion nozzle arranged in series; said supersonic nozzle having a variable outlet; at least one auxiliary compressor, said auxiliary compressor having an intake duct communicating with said supersonic intake means upstream of the compressor means of said gas turbine engine and arranged to receive a portion of air therefrom; means to drive said auxiliary compressor from the compressor means of said gas turbine engine; said last mentioned means including a selectively operable clutch for engaging and disengaging said auxiliary compressor from said gas turbine engine; duct means extending from the discharge end of said auxiliary compressor to said supersonic propulsion nozzle of the gas turbine engine with the same bypassing the compressor mean, combustion means, and turbine means of the gas turbine engine, said duct means receiving all of the air compressed by said auxiliary compressor and delivering it into the hot propulsive gas stream within said propulsion nozzle; selectively operable valve means in said duct means, said valve means having a first position for permitting flow of air through said duct means to said supersonic propulsion nozzle, a second position for diverting flow of air through said duct means to atmosphere and a third position for restricting flow of air through said duct means.

8. A power plant as claimed in claim 7 in which said drive means between said auxiliary compressor and the compressor means of said gas turbine engine includes a first beveled gear rotated by the compressor means of said gas turbine engine, a second beveled gear meshing with said first beveled gear, a drive shaft extending through a strut in the air intake means of the gas turbine engine, said drive shaft being connected at its inner end with said second beveled gear, a third beveled gear on the outer end of said drive shaft, a fourth beveled gear meshing with said third beveled gear, and a rotor shaft for said auxiliary compressor, said fourth beveled gear being operatively connected to said rotor shaft.

9. A power plant as claimed in claim 8 including a clutch interposed between said fourth beveled gear and the rotor shaft for said auxiliary compressor.

10. A power plant as claimed in claim 8 including a clutch interposed between said first beveled gear and the compressor means of said gas turbine engine.

11. A power plant as claimed in claim 7 in which said drive means between said auxiliary compressor and the compressor means of said gas turbine engine include a gear train comprising a series of spur gears in mesh with one another, the first of said series of spur gears being rotated by the compressor means of said gas turbine engine and the last of said series of spur gears being operatively connected to the auxiliary compressor for driving the same.

12. A power plant as claimed in claim 7 in which said drive means includes a pair of drive shafts each driven by the compressor means of said gas turbine engine, a clutch having an input shaft and an output shaft, said input shaft being operatively connected to said pair of drive shafts and the output shaft of said clutch being operatively connected to said auxiliary compressor.

13. A power plant as claimed in claim 7 in which said drive means includes a pair of drive shafts each driven by said compressor means of the gas turbine engine, said auxiliary compressor including a pair of rotors, one of said rotors being driven by one drive shaft and the other of said rotors being driven by the other drive shaft and clutch means for selectively engaging and disengaging each of said pair of drive shafts.

References Cited by the Examiner
UNITED STATES PATENTS

| | | |
|---|---|---|
| 2,501,633 | 3/50 | Price. |
| 2,619,795 | 12/52 | Drake _____ 60—35.5 |
| 2,630,673 | 3/53 | Woll. |
| 2,653,446 | 9/53 | Price. |
| 2,672,726 | 3/54 | Wolf et al. _____ 60—35.6 X |
| 2,696,079 | 12/54 | Kappus _____ 60—35.6 X |
| 2,703,477 | 3/55 | Anxionnaz. |
| 3,013,385 | 12/61 | Kerry et al. |
| 3,060,680 | 10/62 | Wilde et al. _____ 60—35.6 |

SAMUEL LEVINE, *Primary Examiner.*

ABRAM BLUM, *Examiner.*